May 10, 1932.  A. P. BUQUOR  1,857,234
COMPENSATING SPRING SUSPENSION SYSTEM FOR MOTOR VEHICLES
Filed March 17, 1930
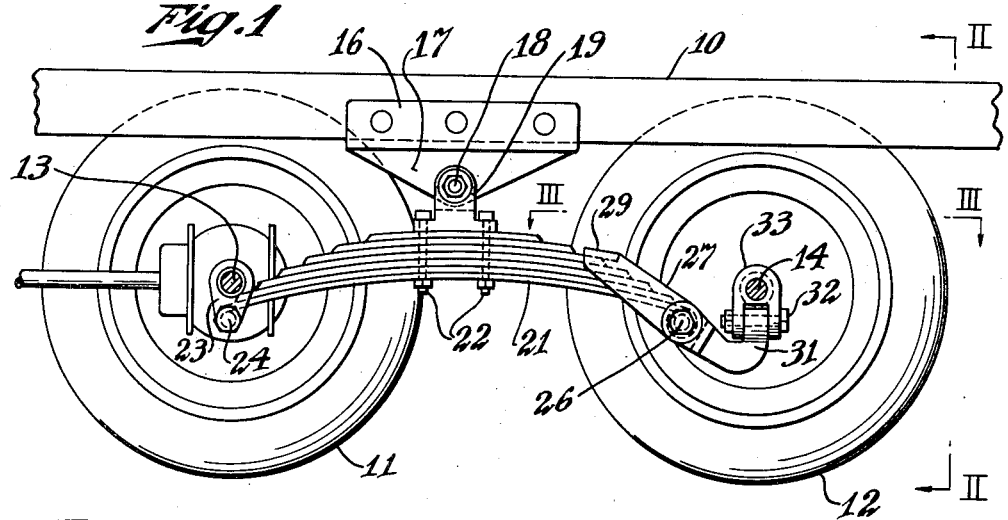
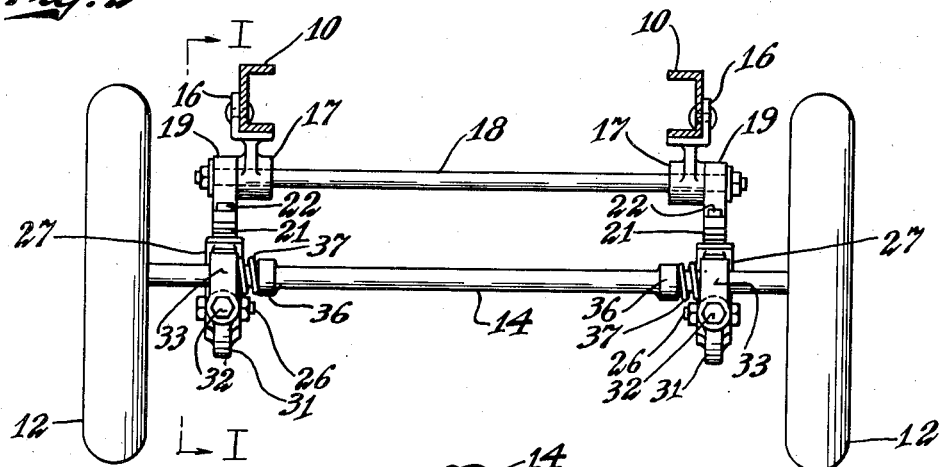
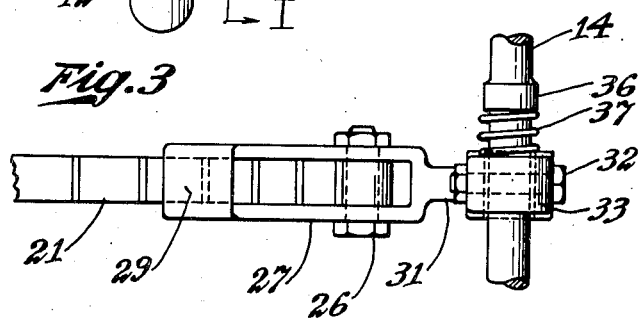
INVENTOR
A. P. Buquor
BY
Johnston & Jennings
ATTORNEYS Patented May 10, 1932

1,857,234

UNITED STATES PATENT OFFICE

ADOLPH P. BUQUOR, OF LOS ANGELES, CALIFORNIA, ASSIGNOR OF ONE-HALF TO CLARENCE R. MEDLEY, OF COLUMBUS, GEORGIA

COMPENSATING SPRING SUSPENSION SYSTEM FOR MOTOR VEHICLES

Application filed March 17, 1930. Serial No. 436,622.

My invention relates to a load equalizing suspension system for tandem pairs of wheels of motor vehicles, and has for its object the provision of apparatus of the character designated which shall be simple and sturdy of design, economical of manufacture, and of extreme flexibility in operation.

A further object of my invention is to provide a load equalizing and suspension system of the character described which shall be particularly adapted for the addition of tandem wheels to ordinary four-wheel motor vehicles, and wherein relative angular movement of the wheel axles may occur without imposing a torsional strain on the members of the equalizing and suspension system.

A more specific object of my invention is to provide a means for adding tandem wheels to ordinary four-wheel motor vehicles, which shall include a load equalizing means effective to maintain proper linear spacing of the tandem wheels while permitting free relative angular movement of the wheel axles with a minimum of torsional strain on the equalizing members.

It has already been well established that the conversion of ordinary four-wheel motor vehicles to six-wheel vehicles by the addition of tandem wheels, greatly increases the load capacity of the vehicle without imposing concentrated loads upon the road. Difficulties have been encountered, however, in providing a sturdy flexible mechanism for mounting the additional wheels and for distributing the load between adjacent pairs of wheels. Such a mechanism, to meet the requirements of operation, must provide for proper linear spacing of the pairs of wheels; for free relative angular movement between adjacent axles to adapt the vehicle to uneven road surfaces; and for proper proportional load distribution to all the wheels under all conditions of service.

In my copending application, Serial No. 438,592, filed March 24, 1930, there is shown, described and claimed an apparatus for meeting the above requirements, wherein tandem pairs of wheels of a motor vehicle are connected to the frame on each side through a laminated leaf spring equalizer which is connected to the trailer axle by an oscillatory laterally movable connection, permitting unequal vertical displacement of the several wheels while maintaining them in proper linear spaced relation. In accordance with my present invention, I employ similar leaf springs for equalizing the load on the axles and provide an improved laterally yieldable and freely rocking connection between the equalizer and the trailing axle. By the connection thus provided, lateral strain upon the tires is minimized when rounding curves and torsional strain on the springs and frame upon unequal vertical displacement of the wheels is practically eliminated.

Apparatus embodying features of my invention is illustrated in the accompanying drawings forming a part of this application, in which Fig. 1 is a sectional elevation taken along the line I—I of Fig. 2;

Fig. 2 is a sectional elevation taken along the line II—II of Fig. 1; and

Fig. 3 is a fragmentary plan view showing the connection between the equalizing spring and the trailing axle.

Referring now to the drawings for a better understanding of my invention, I show a motor vehicle embodying a frame having longitudinal members 10, a pair of driving wheels 11, only one of which is shown, and a pair of trailing wheels 12. The driving wheels 11 are mounted upon a power driven axle 13, and the trailing wheels 12 are mounted upon a trailing axle 14.

Disposed intermediate the driving and trailing wheels 11 and 12, and rigidly secured to the frame members 10 on each side of the vehicle, is a bracket 16 having relatively heavy depending lugs 17 formed thereon. Extending transversely of the vehicle through the lugs 17 is a shaft 18, on the ends of which are pivotally mounted rocking members 19. The rocking members 19 are each rigidly secured to a laminated leaf spring equalizer member 21, as by means of bolts 22.

The forward end of each of the spring equalizer members 21 is secured to a shackle 23 by means of shackle bolt 24; while the shackle 23 is mounted upon the driving axle 13. The rear end of the spring equalizer member 21 is secured by means of a bolt 26 to a shoe 27 which is closed at the top, as shown at 29, in order to form a rigid connection between the spring equalizer member and the shoe.

The rear end of the shoe 27 is provided with an upturned portion 31 which is hingedly connected as by means of a bolt 32 to a sleeve 33 slidably mounted on the trailer axle 14.

Formed on the axle 14 and inwardly spaced from the two sleeves 33 are shoulders 36, and disposed between the shoulders 36 and the sleeves 33 are a pair of similar coil springs 37 which yieldingly restrain the axle 14 against lateral displacement relative to the frame.

Having thus described my invention, the operation and advantages thereof will be readily apparent. The equalizer springs 21 serve to distribute the load between the driving and trailing axles and minimize vertical shocks to the vehicle frame and lading when passing over an uneven road surface. The laterally flexible connection between the ends of the spring equalizer members 21 and the axles permits unequal vertical displacement of the wheels without imposing any torsional strain upon the equalizer members or the vehicle frame. When rounding curves, the necessarily imposed lateral strain upon the vehicle tires is yieldingly resisted by means of the coil springs 37, so that tire wear is greatly minimized and a better tracking of the wheels is obtained. Furthermore, the laterally flexible and laterally slidable connection between the spring equalizer and the trailing axle imparts improved flexibility of operation to the apparatus.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a spring suspension and load equalizing system for motor vehicles embodying a vehicle frame and tandem pairs of wheels, a driving axle for one pair of wheels, a trailing axle for the other pair of wheels, a spring equalizer member on each side of the vehicle pivotally connected to the frame intermediate the two axles, spring shackle means for connecting one end of the spring equalizer to the driving axle, a shoe connected to the other end of the spring equalizer, a laterally slidable sleeve on the trailing axle, and a hinge connection between the shoe and the sleeve.

2. In a spring suspension and load equalizing system for motor vehicles embodying a vehicle frame and tandem pairs of wheels, a driving axle for one pair of wheels, a trailing axle for the other pair of wheels, a spring equalizer member on each side of the vehicle pivotally connected to the frame intermediate the two axles, spring shackle means for connecting one end of the spring equalizer to the driving axle, a shoe connected to the other end of the spring equalizer, a laterally slidable sleeve on the trailing axle, a hinge connection between the shoe and the sleeve, and laterally yieldable means cooperating between the sleeves and the trailing axle to yieldingly restrain the axle against lateral displacement relative to the frame.

3. In a spring suspension and load equalizing system for motor vehicles embodying a vehicle frame and tandem pairs of wheels, a driving axle for one pair of wheels, a trailing axle for the other pair of wheels, a spring equalizer member on each side of the vehicle pivotally connected to the frame intermediate the two axles, spring shackle means for connecting one end of the spring equalizer to the driving axle, a shoe connected to the other end of the spring equalizer, a laterally slidable sleeve on the trailing axle, a hinge connection between the shoe and the sleeve, shoulders on the trailing axle inwardly spaced from the two sleeves, and a coil spring cooperating between each of the sleeves and its adjacent shoulder to yieldingly restrain the axle against lateral displacement relative to the frame.

4. In a spring suspension and load equalizing system for motor vehicles embodying a vehicle frame and tandem pairs of wheels, a driving axle for one pair of wheels, a trailing axle for the other pair of wheels, sleeves mounted on the trailing axle, a spring equalizer member on each side of the vehicle pivotally connected to the frame intermediate the two axles, spring shackle means for connecting one end of each spring equalizer member to the driving axle, and a shoe engaging the other end of each spring equalizer member and a sleeve.

5. Apparatus in accordance with claim 4 in which the shoes are pivotally connected to the sleeves.

In testimony whereof I affix my signature.

ADOLPH P. BUQUOR.